(12) United States Patent
Huang et al.

(10) Patent No.: US 12,078,528 B2
(45) Date of Patent: Sep. 3, 2024

(54) FIBER SENSING USING SUPERVISORY PATH OF SUBMARINE CABLES

(71) Applicant: NEC Laboratories America, Inc., Princeton, NJ (US)

(72) Inventors: Ming-Fang Huang, Princeton, NJ (US); Shaobo Han, Princeton, NJ (US); Yuheng Chen, South Brunswick, NJ (US); Milad Salemi, Cross River, NY (US); Ting Wang, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 236 days.

(21) Appl. No.: 17/869,763

(22) Filed: Jul. 20, 2022

(65) Prior Publication Data

US 2023/0027287 A1 Jan. 26, 2023

Related U.S. Application Data

(60) Provisional application No. 63/224,532, filed on Jul. 22, 2021, provisional application No. 63/224,554, filed on Jul. 22, 2021.

(51) Int. Cl.
*G01H 9/00* (2006.01)
*G01D 5/353* (2006.01)

(52) U.S. Cl.
CPC ......... *G01H 9/004* (2013.01); *G01D 5/35361* (2013.01)

(58) Field of Classification Search
CPC ............................ G01H 9/004; G01D 5/3536
USPC .......................................................... 385/13
See application file for complete search history.

(56) References Cited

U.S. PATENT DOCUMENTS

| | | | | |
|---|---|---|---|---|
| 2012/0017687 | A1* | 1/2012 | Davis | G01D 5/35358 73/655 |
| 2013/0242698 | A1* | 9/2013 | McEwen-King | G01V 1/226 367/37 |
| 2013/0319121 | A1* | 12/2013 | Hill | G01H 9/004 73/645 |
| 2017/0075029 | A1* | 3/2017 | Cuny | G01V 1/52 |
| 2021/0013962 | A1* | 1/2021 | Mansouri Rad | H04B 10/0779 |
| 2021/0140814 | A1* | 5/2021 | Aktas | G01H 9/006 |

(Continued)

FOREIGN PATENT DOCUMENTS

CN 110131590 A * 8/2019 ............. F17D 5/02

*Primary Examiner* — Kaveh C Kianni
(74) *Attorney, Agent, or Firm* — Joseph Kolodka

(57) ABSTRACT

Systems, and methods for automatically identifying an underground optical fiber cable length from DFOS systems in real time and pair it with GPS coordinates that advantageously eliminate the need for in-field inspection/work by service personnel to make such real-time distance/location determinations. As such, inefficient, error-prone and labor-intensive prior art methods are rendered obsolete. Operationally, our method disclosure involves driving vehicles including GPS to generate traffic patterns and automatically mapping traffic trajectory signals from a deployed buried fiber optic cable to locate geographic location(s) of the buried fiber optic cable. Traffic patterns are automatically recognized; slack in the fiber optic cable is accounted for; location of traffic lights and other traffic control devices/structures may be determined; and turns in the fiber optic cable may likewise be determined.

10 Claims, 22 Drawing Sheets

(56) References Cited

U.S. PATENT DOCUMENTS

2021/0180997 A1* 6/2021 Huang ................ G01H 9/004
2022/0326112 A1* 10/2022 Tian ................ G01M 5/0091

* cited by examiner

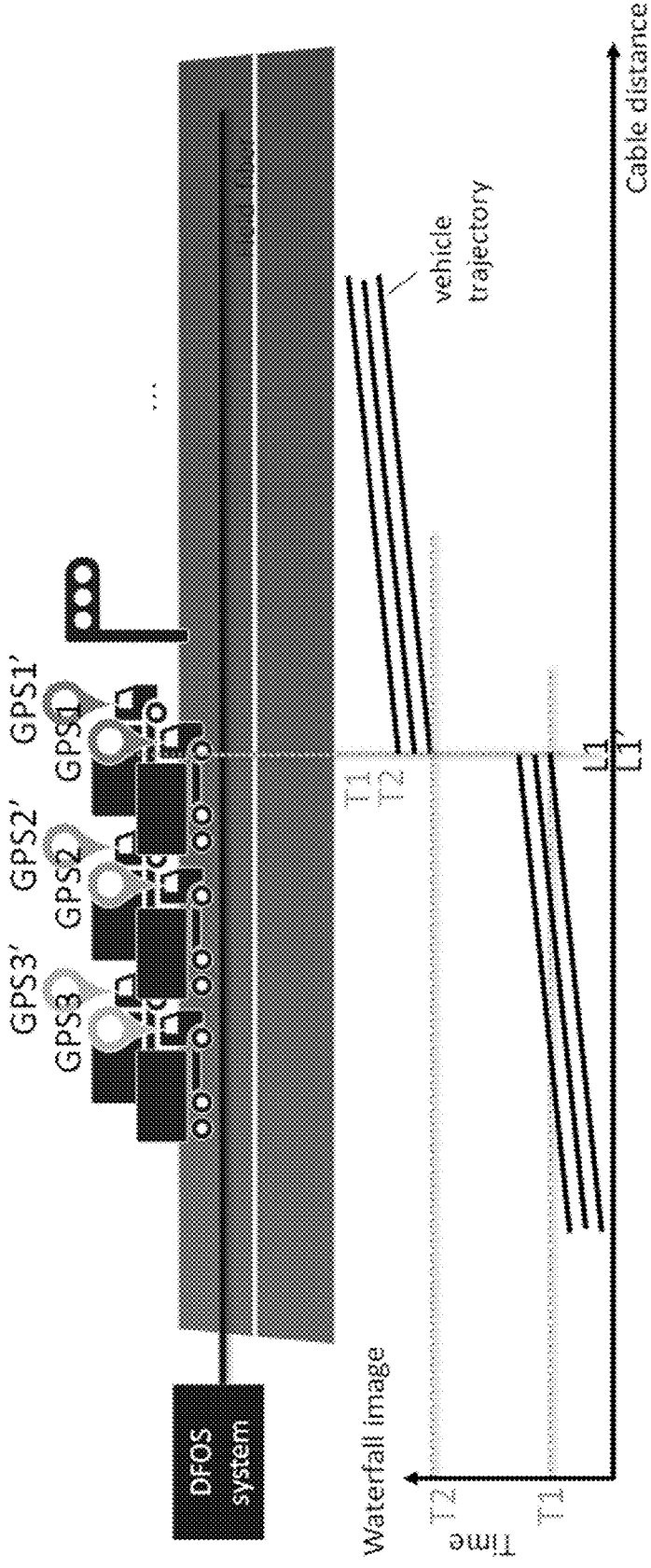

FIBER SENSING USING SUPERVISORY PATH OF SUBMARINE CABLES

CROSS REFERENCE TO RELATED APPLICATIONS

This application claims the benefit of U.S. Provisional Patent Application Ser. No. 63/224,532 filed 22 Jul. 2021 and U.S. Provisional Patent Application Ser. No. 63/224,554 filed 22 Jul. 2021, the entire contents of each is incorporated by reference as if set forth at length herein.

TECHNICAL FIELD

This disclosure relates generally to optical fiber telecommunications facilities. More particularly, it describes systems and methods for vehicle-assisted buried cable localization using distributed fiber optic sensing (DFOS).

BACKGROUND

As those skilled in the art will readily appreciate, optical time-domain reflectometry (OTDR) is a useful technique for determining length and loss of contemporary fiber optic telecommunications facilities. For cable localization determinations, OTDR—coupled with a technicians' experience—provided educated guesses of fiber optic facility locations corresponding to cable length. Given the pervasiveness of fiber optic telecommunications facilities and their enablement of contemporary telecommunications services, systems and methods that provide an easier, more accurate fiber facility location information would represent a welcome addition to the art.

SUMMARY

An advance in the art is made according to aspects of the present disclosure directed to systems, and methods for automatically identifying an underground optical fiber cable length from DFOS systems in real time and pair it with GPS coordinates.

In sharp contrast to the prior art, systems, and methods according to aspects of the present disclosure eliminate the need for in-field inspection/work by service personnel to make such real-time distance/location determinations. As such, inefficient, error-prone and labor-intensive prior art methods are rendered obsolete.

Operationally, our inventive disclosure involves driving vehicles including GPS to generate traffic patterns and automatically mapping traffic trajectory signals from a deployed buried fiber optic cable to locate geographic location(s) of the buried fiber optic cable. As we shall disclose further, several advantageous aspects of our inventive systems and methods emerge, namely that traffic patterns are automatically recognized; slack in the fiber optic cable is accounted for; location of traffic lights and other traffic control devices/structures may be determined; and turns in the fiber optic cable may likewise be determined.

BRIEF DESCRIPTION OF THE DRAWING

A more complete understanding of the present disclosure may be realized by reference to the accompanying drawing in which:

FIG. 5 is a schematic diagram illustrating Case-3: Traffic Light (All stop by right lights) cable section under investigation according to aspects of the present disclosure;

Figure 1:
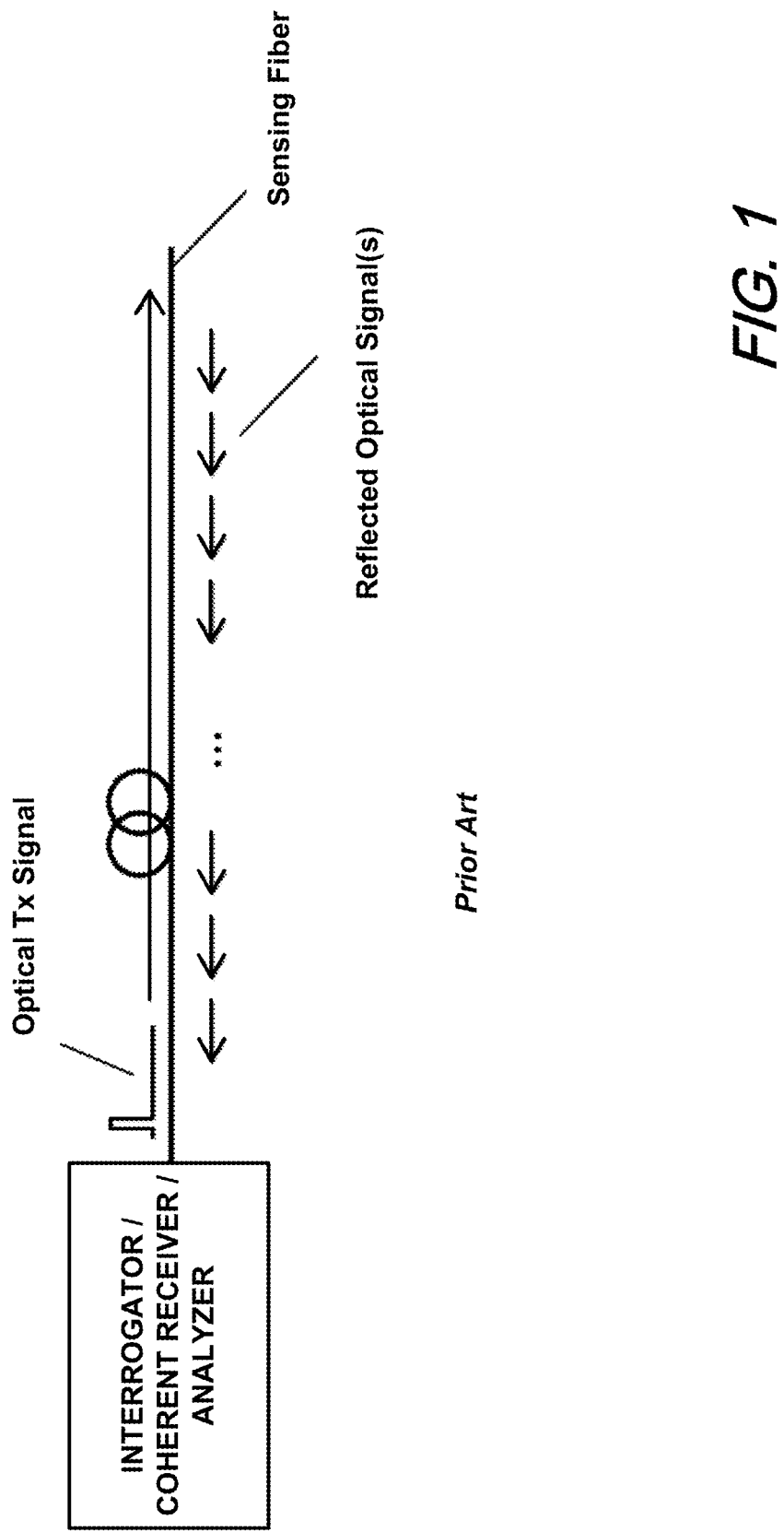
FIG. 1 is a schematic diagram of an illustrative distributed fiber optic sensing system according to aspects of the present disclosure.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGS. comprising the drawing are not drawn to scale.

By way of some additional background, we note that distributed fiber optic sensing systems interconnect optoelectronic integrators to an optical fiber (or cable), converting the fiber to an array of sensors distributed along the length of the fiber. In effect, the fiber becomes a sensor, while the interrogator generates/injects laser light energy into the fiber and senses/detects events along the fiber length.

As those skilled in the art will understand and appreciate, DFOS technology can be deployed to continuously monitor vehicle movement, human traffic, excavating activity, seismic activity, temperatures, structural integrity, liquid and gas leaks, and many other conditions and activities. It is used around the world to monitor power stations, telecom networks, railways, roads, bridges, international borders, critical infrastructure, terrestrial and subsea power and pipelines, and downhole applications in oil, gas, and enhanced geothermal electricity generation. Advantageously, distributed fiber optic sensing is not constrained by line of sight or remote power access and—depending on system configuration—can be deployed in continuous lengths exceeding 30 miles with sensing/detection at every point along its length. As such, cost per sensing point over great distances typically cannot be matched by competing technologies.

Fiber optic sensing measures changes in "backscattering" of light occurring in an optical sensing fiber when the sensing fiber encounters vibration, strain, or temperature change events. As noted, the sensing fiber serves as sensor over its entire length, delivering real time information on physical/environmental surroundings, and fiber integrity/security. Furthermore, distributed fiber optic sensing data pinpoints a precise location of events and conditions occurring at or near the sensing fiber.

A schematic diagram illustrating the generalized arrangement and operation of a distributed fiber optic sensing system including artificial intelligence analysis and cloud storage/service is shown in FIG. 1. With reference to FIG. 1 one may observe an optical sensing fiber that in turn is connected to an interrogator. As is known, contemporary interrogators are systems that generate an input signal to the fiber and detects/analyzes reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. It can also be a signal of forward direction that uses the speed difference of multiple modes. Without losing generality, the following description assumes reflected signal though the same approaches can be applied to forwarded signal as well.

As will be appreciated, a contemporary DFOS system includes the interrogator that periodically generates optical pulses (or any coded signal) and injects them into an optical fiber. The injected optical pulse signal is conveyed along the optical fiber.

At locations along the length of the fiber, a small portion of signal is scattered/reflected and conveyed back to the interrogator. The scattered/reflected signal carries information the interrogator uses to detect, such as a power level change that indicates—for example—a mechanical vibration.

The reflected signal is converted to electrical domain and processed inside the interrogator. Based on the pulse injection time and the time signal is detected, the interrogator determines at which location along the fiber the signal is coming from, thus able to sense the activity of each location along the fiber.

Distributed Acoustic Sensing (DAS)/Distributed Vibrational Sensing (DVS) systems detect vibrations and capture acoustic energy along the length of optical sensing fiber. Advantageously, existing, traffic carrying fiber optic networks may be utilized and turned into a distributed acoustic sensor, capturing real-time data. Classification algorithms may be further used to detect and locate events such as leaks, cable faults, intrusion activities, or other abnormal events including both acoustic and/or vibrational.

Various DAS/DVS technologies are presently used with the most common being based on Coherent Optical Time Domain Reflectometry (C-OTDR). C-OTDR utilizes Rayleigh back-scattering, allowing acoustic frequency signals to be detected over long distances. An interrogator sends a coherent laser pulse along the length of an optical sensor fiber (cable). Scattering sites within the fiber cause the fiber to act as a distributed interferometer with a gauge length like that of the pulse length (e.g. 10 meters). Acoustic/mechanical disturbance acting on the sensor fiber generates microscopic elongation or compression of the fiber (micro-strain), which causes a change in the phase relation and/or amplitude of the light pulses traversing therein.

Before a next laser pulse is be transmitted, a previous pulse must have had time to travel the full length of the sensing fiber and for its scattering/reflections to return. Hence the maximum pulse rate is determined by the length of the fiber. Therefore, acoustic signals can be measured that vary at frequencies up to the Nyquist frequency, which is typically haft of the pulse rate. As higher frequencies are attenuated very quickly, most of the relevant ones to detect and classify events are in the lower of the 2 kHz range.

As we shall show and describe and as already noted, our inventive systems and methods automatically detect/interpret vibration signals resulting from DFOS operation using deployed fiber optic sensor cables to detect/locate cable vibrations caused by—for example—vehicles operating sufficiently proximate to the deployed fiber optic sensor cable.

As is known, telecommunications carriers and network providers own and operate millions of miles of deployed optical fiber. Those skilled in the art will understand and appreciate that it is critical for carries to locate the geographic positions of fiber cables when fiber cables experience a fault (e.g., fiber cut). Oftentimes, maintenance operations rely on prior information and knowledge of cable location and orientation, which can sometimes be acquired from construction maps of a deployment site or notes and photos that may be made/recorded during construction/deployment of fiber cables. When such prior knowledge is absent or unavailable it is challenging for the telecommunications carriers and operators thereof to locate and pinpoint an exact segment or location of a fiber cable that requires inspection or repair. Thus, localizing such portions of an optical cable is of great significance for carriers to efficiently maintain facilities.

Presently, widely used cable localization methods generally employ optical time-domain reflectometry (OTDR) techniques to measure fiber length and loss. OTDR, coupled with technicians' experience is used to guess/determine a geographic location of interest by corresponding it to the fiber length. Unfortunately, contemporary OTDR measurement systems and methods do not provide a location of interest on a geographic map and cannot accurately pinpoint a location of interest due—in part—to the existence of slack cable along a given route.

Previously, we described schemes using distributed fiber optic sensing (DFOS) technologies and AI algorithms to recognize cable location by exciting signals externally using a mechanical vibrator. However, such methods still rely on human/technicians who manually operate the mechanical vibrator in the field. These procedures remain inefficient, error prone and labor-intensive. For large-scale field deployment, a self-determination method is needed, to detect the target vibration signals from entire fiber cable route(s) and distinguish it in different scenarios. Accordingly, and as noted previously, one aspect of the present disclosure is to describe inventive systems and methods that automatically identify underground cable length from the waterfall data by DFOS systems in real time and pair it with GPS coordinates associated with in-field vehicles. Advantageously, systems and methods according to the present disclosure may eliminate any field deployment to determine fiber cable locations as is the case in the prior/current art.

Figure 2A:
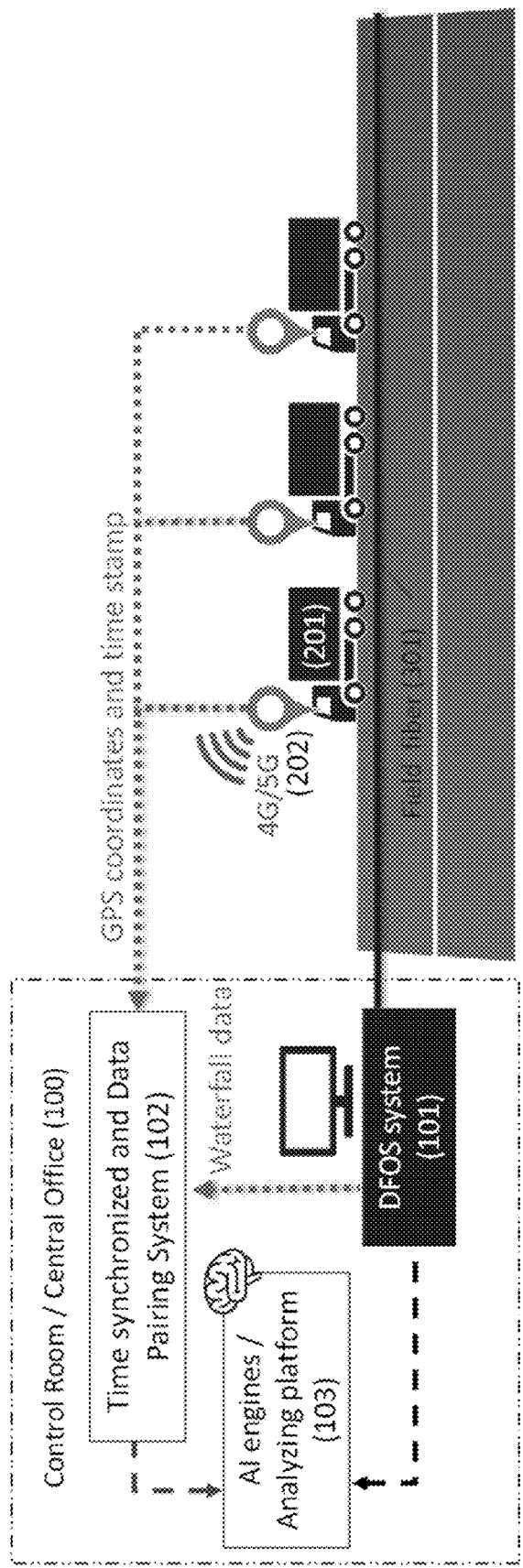
FIG. 2(A) is a schematic diagram illustrating a system layout of a sensor layer overlaid on existing deployed optical fiber.
Figure 2B:
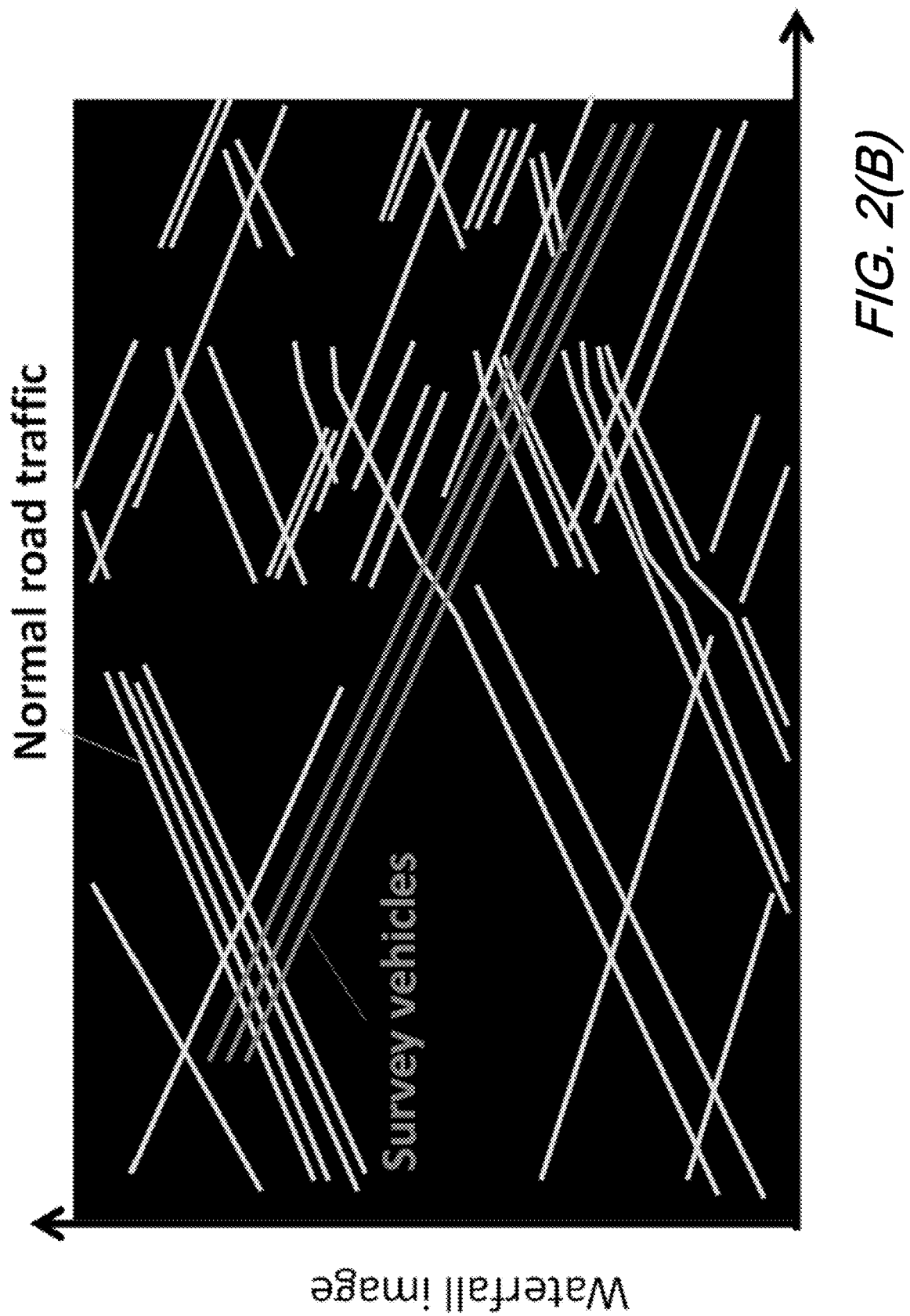
FIG. 2(B) shows an illustrative diagram for a scheme according to aspects of the present disclosure.
Figure 2C:
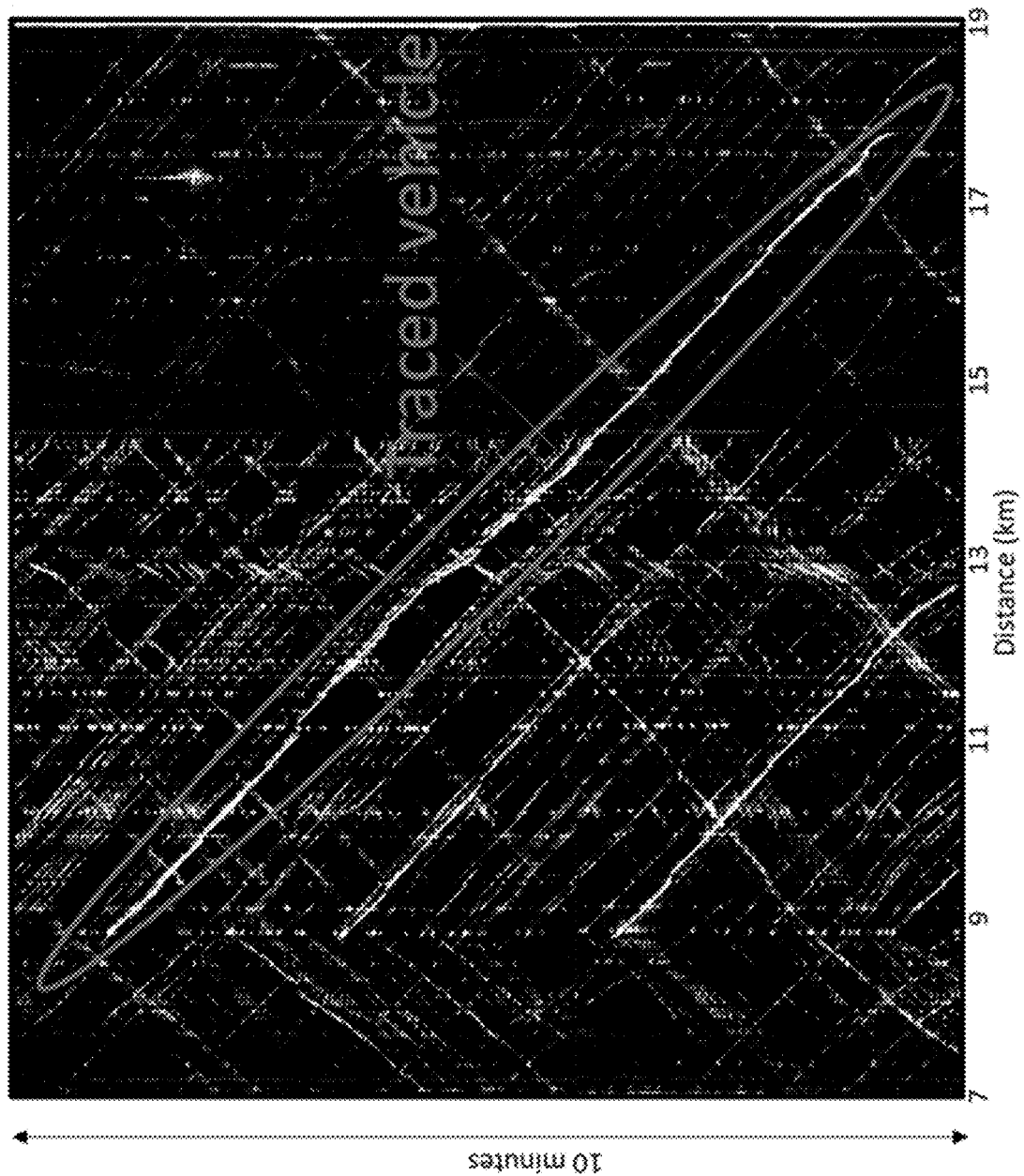
FIG. 2(C) shows an illustrative waterfall trace according to aspects of the present disclosure.

FIG. 2(A) is a schematic diagram illustrating a system layout of a sensor layer overlaid on existing deployed optical fiber. FIG. 2(B) shows an illustrative diagram for a scheme according to aspects of the present disclosure. FIG. 2(C) shows an illustrative waterfall trace according to aspects of the present disclosure.

With reference to FIG. 2(A), there is shown a configuration including a sensing layer overlaid on existing deployed fiber networks. The distributed fiber optic sensing system (DFOS) (101) which can employ distributed acoustic sensing (DAS) and/or distributed vibration sensing (DVS) techniques, is shown located in a control office (CO)/central office (100) for remote monitoring of an entire cable route. As can be appreciated, the DFOS system is connected to the field optical fiber to provide sensing functions. Advantageously, the fiber can be a dark fiber or operational fiber carrying live traffic from one or more service providers.

To create recognizable traffic patterns, 3 trucks (201) are shown as being involved in a survey and driving together along the cable route. As shown in FIG. 2(B), the traffic patterns of 3 following trucks are different from the regular road traffic which may be identified by using artificial intelligent (A.I.) systems, methods, and algorithms. The GPS device (202) is carried by every truck (201) and transmits GPS coordinates and time stamp(s) of a respective truck to the pairing system (102) shown located in the central office (CO). By matching the time stamps of the GPS device and the DFOS system, the geographic location of the target location can be paired with fiber distance from waterfall data and GPS coordinates in the A.I. platform (103).

FIG. 2(C) shows an example of waterfall data collected by an illustrative DFOS system with one traced vehicle trajectory. For the one traced vehicle, the traffic pattern may be distinguished from other road traffic. Further differentiation can be realized if 3 trucks travel together as a unit.

Those skilled in the art will appreciate that our inventive use of 3 vehicles provide numerous benefits as we have now determined to be in part to include the following. First, it is easier to distinguish targeted traffic trajectory from waterfall traces than normal road traffic signals. Second, any location of buried cable can be discovered by driving trucks—even though the fiber cable is few meters away from the road, the vibrations created by heavy trucks still can be detected from DFOS systems. Third, if some locations are not accessible, the A.I. analyzing platform will have the fitting algorithms based on two points before and after. Fourth, vehicle headway can be determinated by two GPS locations. Finally, particular facilities can be discovered namely, manhole locations and slack fiber amounts, traffic lights (when the survey trucks stopped by red lights), and cable turn locations. Note that this above list of benefits is abbreviated and further benefits and advantages of our inventive methods, systems and techniques will become more apparent with the following discussion.

Figure 3:
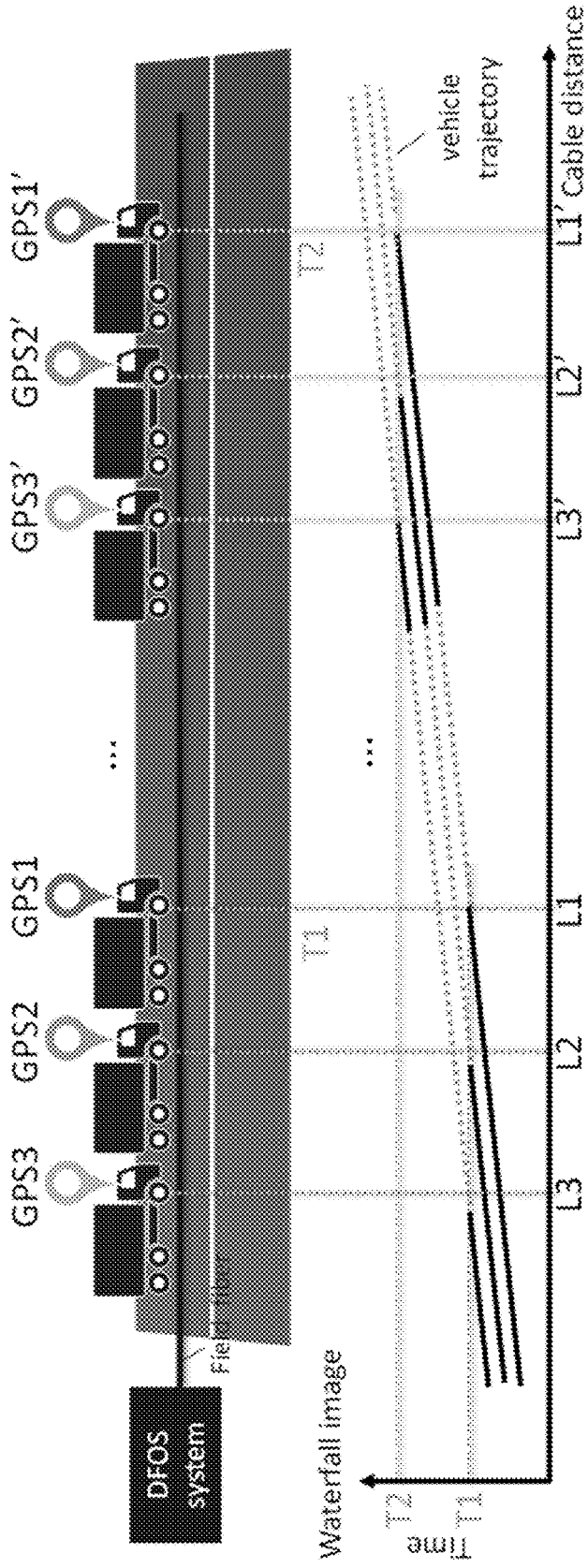
FIG. 3 is a schematic diagram illustrating Case-1: Straight Line cable section under investigation according to aspects of the present disclosure.

FIG. 3 is a schematic diagram illustrating Case-1: Straight Line cable section under investigation according to aspects of the present disclosure. With reference to that figure, it may be observed that at a different time stamp (T1, T2), a survey truck will pass 2 locations (L1, L1'). At T1, the pairing system can map the GPS1 coordinates and cable length L1 on the GIS system, meanwhile, GPS1' coordinates is paired to L1' at time stamp of T2. Since it is a straight-line cable, the distance from GPS (GPS1'–GPS1) will be same as cable length from DFOS (L1'–L1). Additionally, the second and third trucks are not only for traffic trajectory generation but also system validations, such as the distance of GPS2'–GPS2=L2'–L2 and GPS3'–GPS3=L3'–L3.

Figure 4A:
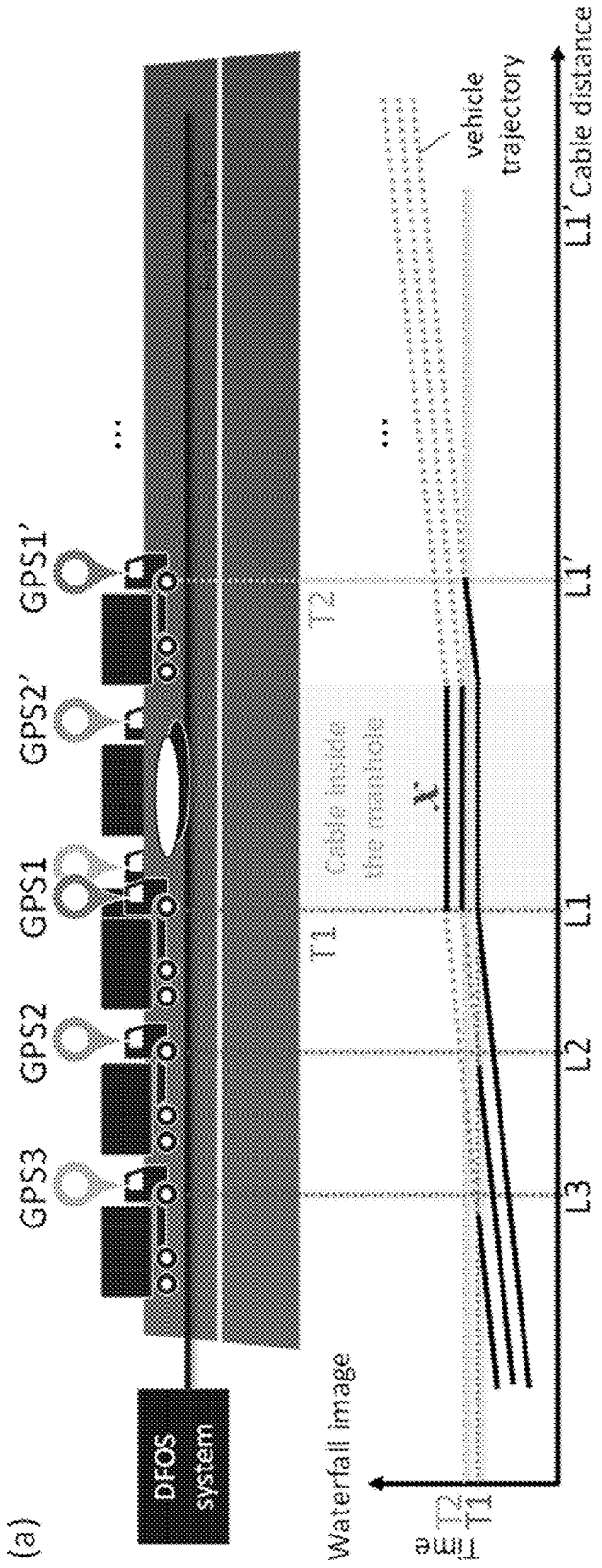
FIG. 4(A) is a schematic diagram illustrating Case-2: Straight Line, Manhole in Between cable section under investigation according to aspects of the present disclosure.
Figure 4B:
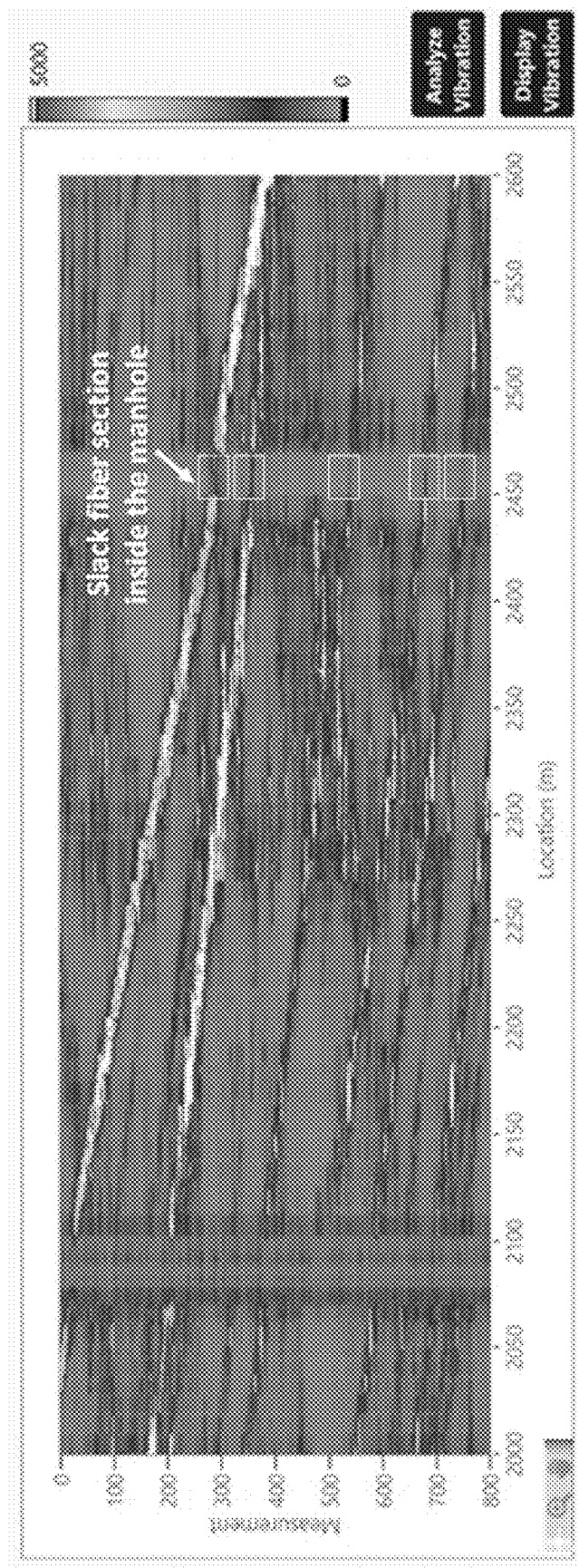
FIG. 4(B) is a diagram illustrating waterfall data collected by illustrative DFOS operation according to aspects of the present disclosure.

FIG. 4(A) is a schematic diagram illustrating Case-2: Straight Line, Manhole in Between cable section under investigation according to aspects of the present disclosure; and FIG. 4(B) is a diagram illustrating waterfall data collected by illustrative DFOS operation according to aspects of the present disclosure. As may be observed, this figure illustrates manholes along a fiber optic cable route. There is a slope for the traffic trajectory when vehicle driving on the road. However, the slope will be flat when passing a manhole with slack fibers inside. It can be seen from FIG. 4(B)—which includes field data collected from the DFOS. In this illustrative case, the cable length of (L1'–L1) is longer than the GPS distance (GPS1'–GPS1). The difference is due to slack fibers (x) inside the manhole: x=(L1'–L1)–(GPS1'–GPS1). Moreover, the information (coordinates and cable length) of the manhole can be determinated at T1 (starting point of flat slope) with corresponding GPS1 and L1

FIG. 5 is a schematic diagram illustrating Case-3: Traffic Light (All stop by right lights) cable section under investigation according to aspects of the present disclosure. As may be observed, this figure shows an example wherein survey trucks stopped by traffic lights. From the waterfall data, the traffic trajectory will be discontinued. At T1, when the survey truck is stopped by the red traffic light, the traffic patterns are removed as well. The patterns will be continued after the green light and T2. Hence, the information of the traffic light can be discovered at T1 with corresponding GPS1 and L1. The red-light period can be known as T2-T1. Note that the traffic lights only can be discovered when the survey traffic is stopped by red lights—or other similar traffic control devices.

Figure 6:
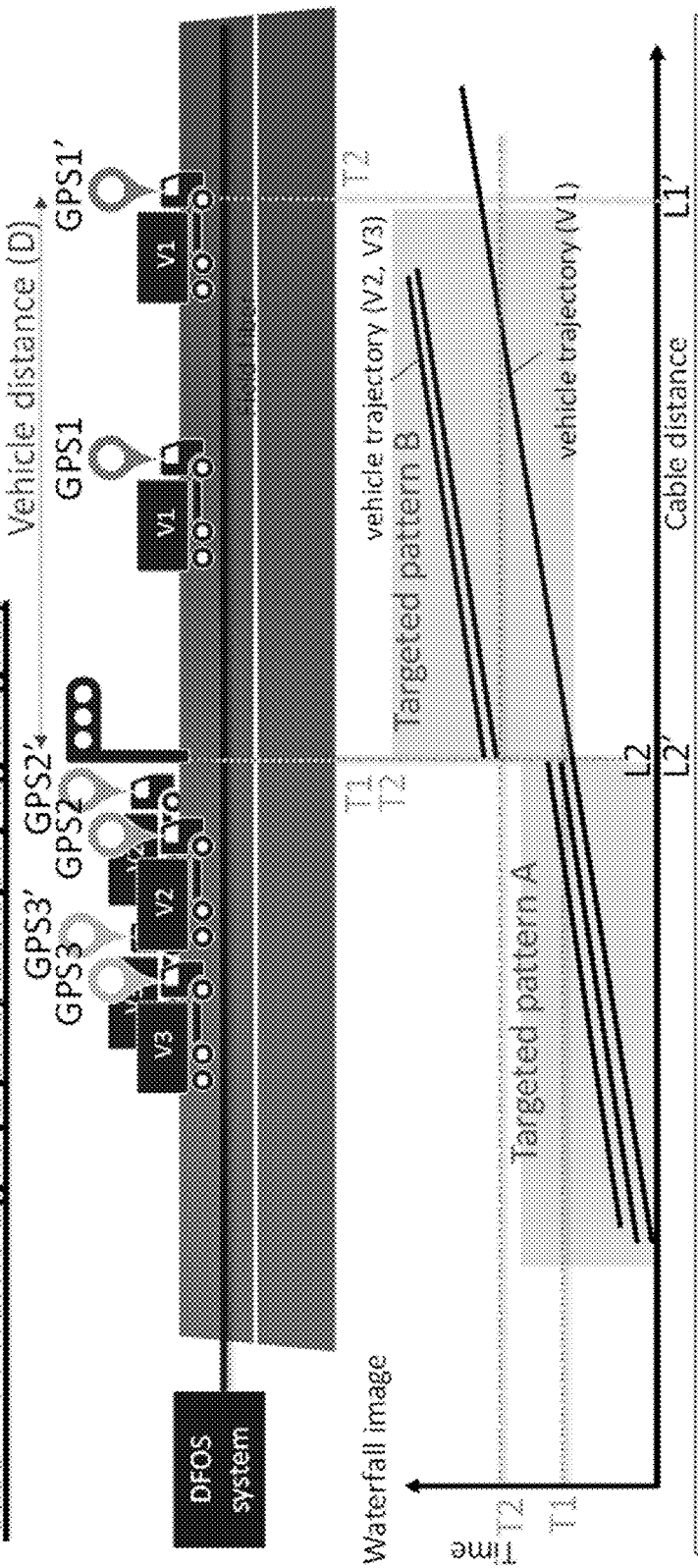
FIG. 6 is a schematic diagram illustrating Case-4: Traffic lights (1 pass 2 stop by right lights) cable section under investigation according to aspects of the present disclosure.

FIG. 6 is a schematic diagram illustrating Case-4: Traffic lights (1 pass 2 stop by right lights) cable section under investigation according to aspects of the present disclosure. As may be observed, this figure shows the example of some survey trucks stopped by traffic lights, but not all of the trucks are stopped. As the example shows, vehicle-1 (V1) passes the traffic light, but V2 and V3 are stopped. This scenario can be detected when the paring data is not matched, e.g., GPS2'-GPS2=0 while GPS1'-GPS1>GPS2'-GPS2 at two-time windows. From the waterfall traces, one traffic trajectory will be continued but two would be discontinued. At T1, 2 survey trucks are stopped by the red light with stopped traffic patterns. The patterns will be continued after the green light and T2. Hence, the information of the traffic light can be discovered at T1 with corresponding GPS2 and L2. The red-light period can be known as T2-T1. Additionally, the vehicle distance (D) can be determined by GPS1'-GPS2' to locate the trajectory of and employed new traffic patterns for the survey even there are some cars between V1 and V2. In this case, the A.I. algorithms will change the targeted patterns from Pattern A (3 trajectories with equal space) to Pattern B (3 trajectories with 1 large space and 2 equal one)

Figure 7:
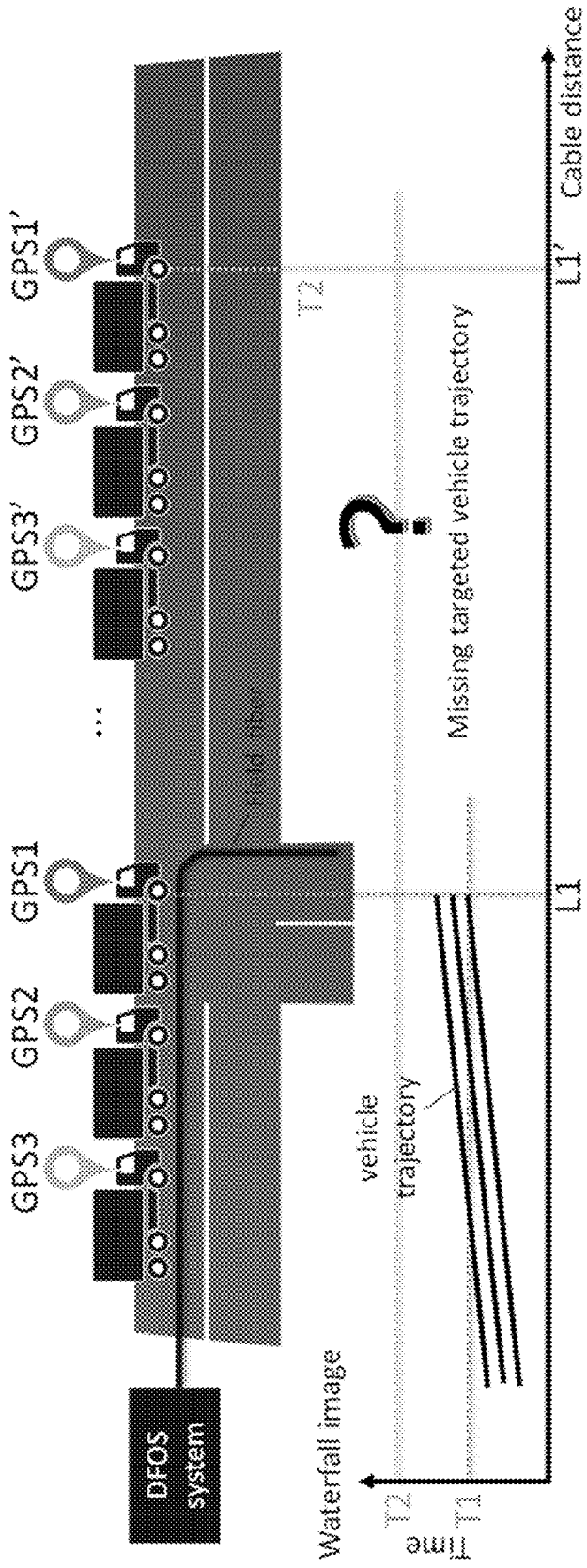
FIG. 7 is a schematic block diagram illustrating Case-4: Cable Turns cable section under investigation according to aspects of the present disclosure.
Figure 8:
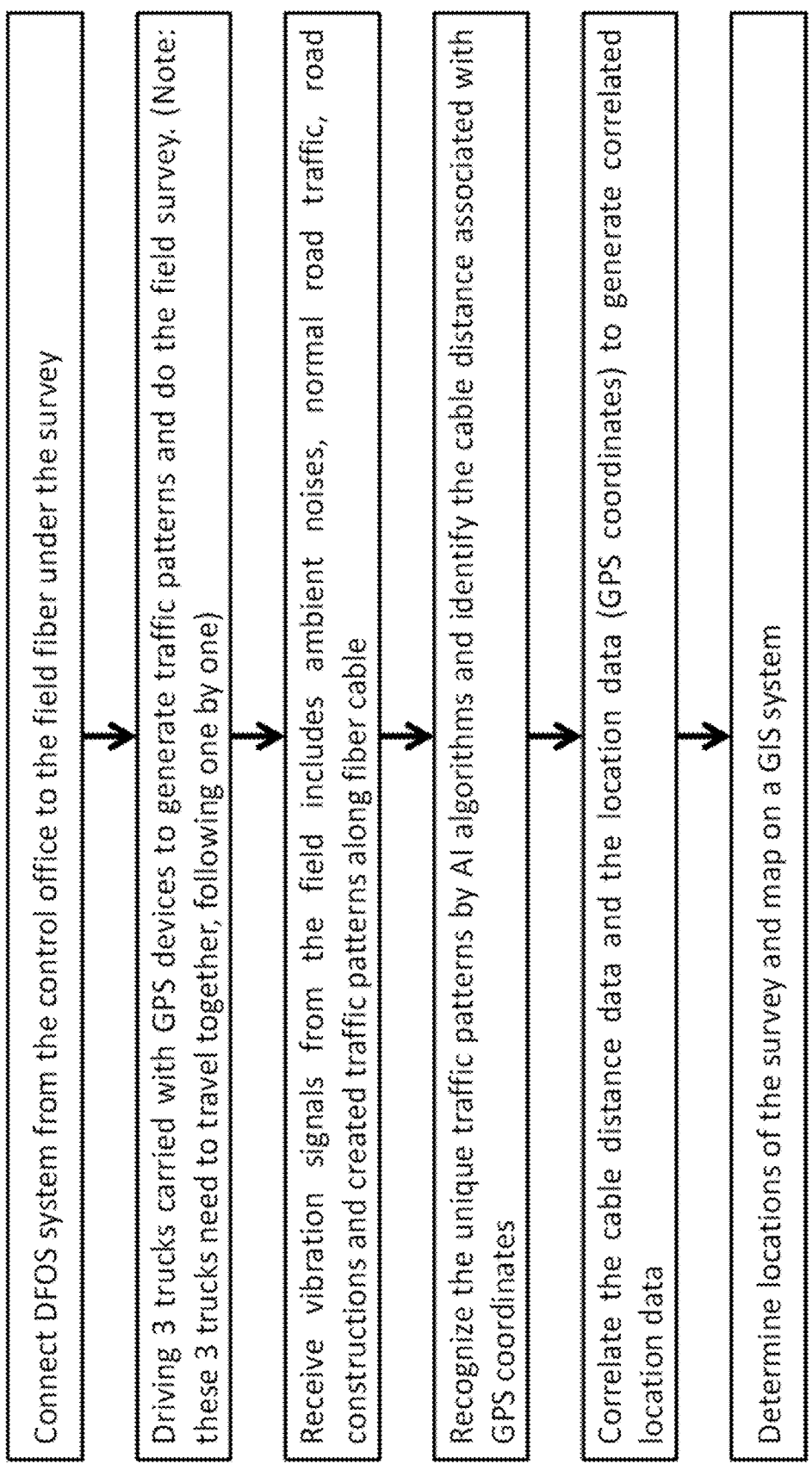
FIG. 8 is a schematic flow diagram of an illustrative overall process according to aspects of the present disclosure.

FIG. 7 is a schematic block diagram illustrating Case-4: Cable Turns cable section under investigation according to aspects of the present disclosure. As may be observed, this figure illustrates an example scenario when the fiber optic cable under investigation is turned. It will be a common case in the city and can be recognized when nothing (no L1') can be paired to GPS1' at T2. In this case, the A.I. platform can send a message to truck drivers and let them know they are on the wrong route. The cable turn point can be known at T1 with corresponding GPS1 and L1. Hence, the survey trucks can go back to the cable turn location and make turn to follow the cable under investigation FIG. 8 is a schematic flow diagram of an illustrative overall fiber optic survey process according to aspects of the present disclosure. With reference to that figure, it may be observed that our inventive systems and method involve connecting a DFOS system located at a control (central) office to a field fiber employed in the survey. Three (3) trucks (vehicles) each including global positioning devices (GPS) are operated to generate traffic patterns thereby forming the field survey. Note that in a preferred operation the three trucks are operated together, generally following one another in a single line, as much as possible. As these vehicles are operated, vibration signals collected/analyzed by the DFOS system include ambient noise(s), normal road traffic, road construction, and other traffic patterns along the length of the fiber optic cable route.

During signal collection/analysis and thereafter, unique traffic patterns are recognized/determined by artificial intelligence systems and algorithms to identify—among other things—cable distance(s) of vibrations generated by the survey vehicle operation and associated with known GPS coordinates of those vehicles. Once such vibration/GPS location(s) are determined, a survey map including such information along with other map-related data may be generated.

As those skilled in the art will readily appreciate, systems, methods and structures according to aspects of the present disclosure may be further refined to provide even more information.

As we have already noted, one aspect of this disclosure is directed to a system and method that employs a vehicle (or vehicles) equipped with a GPS as signal source. While the vehicle is operating proximate to, and along the length of a fiber optic cable under survey, the GPS determines/records instant geographic locations and the DFOS system records a waterfall trajectory of the vehicle.

As we noted, to correctly identify the trajectory of the vehicles from other traffic or events that generate vibratory signals that excite the fiber optic cable under survey, the mapping system needs at least one reference point where the GPS coordinate and the linear distance of cable from that point to central office has been mapped by other methods. As we described previously, a telecom technician can use a mobile power tool like jack hammer to generate a recognizable signal, and fiber sensing systems can use machine learning based algorithms to identify the vibration source linear distance and map the operator's GPS coordinate simultaneously. We note that there exist a number of problems associated with the development of an automated system such as that disclosed according to the present disclosure. More particularly:

Traffic Patterns

In order to recognize the trajectory of a surveying vehicle from other traffic, a truck with low driving speed is recommended for the site survey. The heavy survey truck can create stronger signal for DFOS, and slightly slower speed compared to the normal traffic make the trajectory is much easier to distinguish.

REFERENCE POINTS

The GPS and fiber length of at least one reference point on straight cable section need to be determined. The reference point is typically pickup as the end points of a straight section of the cable.

Mapping

Mapping the time stamp of GPS and DFOS to extract the virtual trajectory meet with actual waterfall traces.

Figure 9:
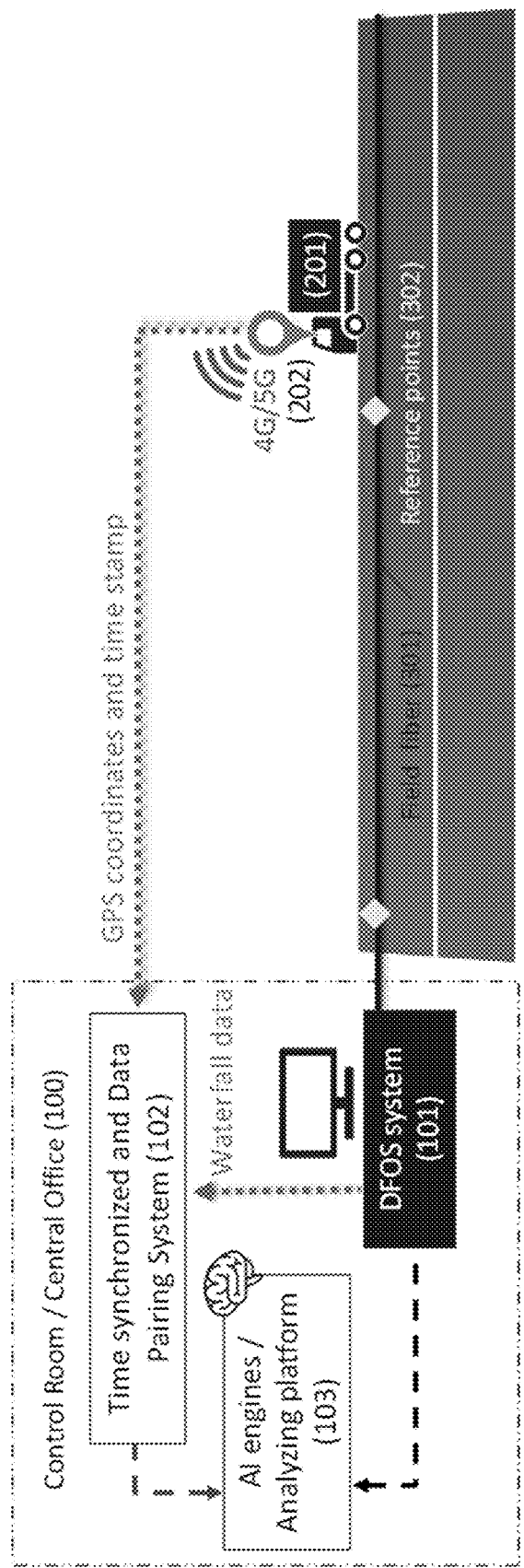
FIG. 9 is a schematic diagram illustrating an architecture for automatically mapping the geographic location of fiber cable according to aspects of the present disclosure.
Figure 10:
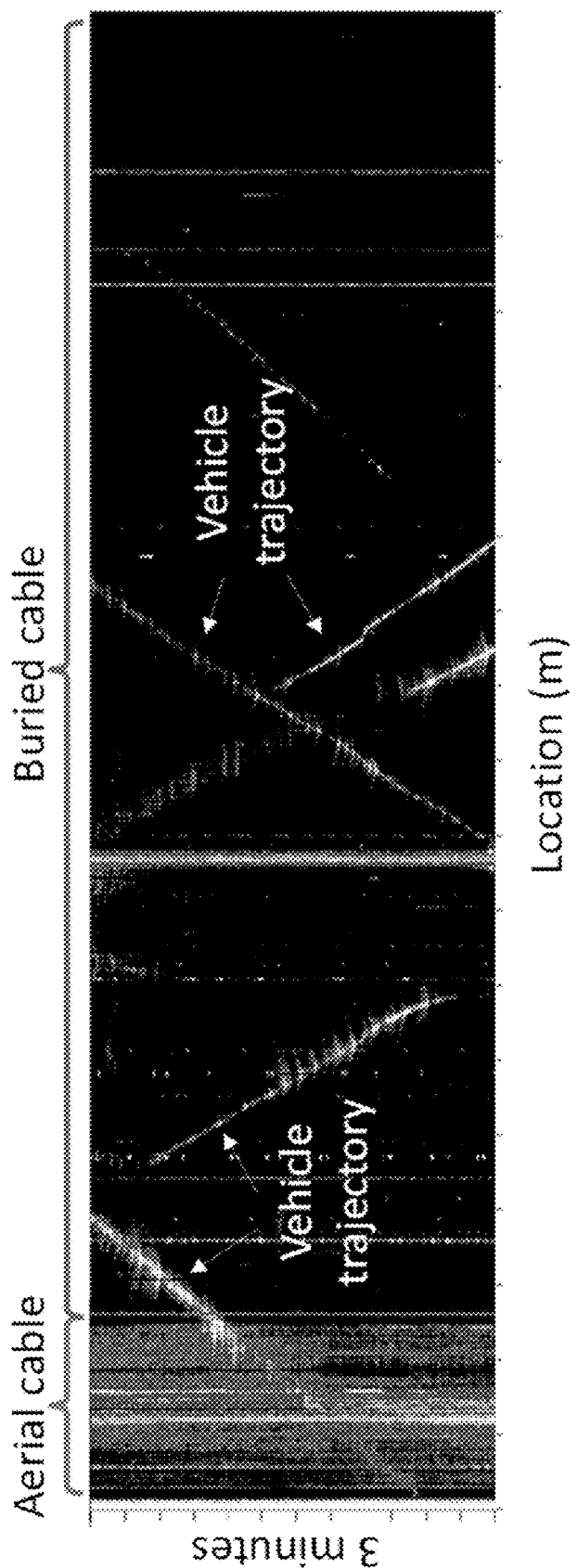
FIG. 10 shows illustrative waterfall traces with vehicle trajectories according to aspects of the present disclosure.

FIG. 9 is a schematic diagram illustrating an architecture for automatically mapping the geographic location of fiber cable according to aspects of the present disclosure. As may be observed from this figure, the distributed fiber optic sensing system (DFOS) (101) which can be distributed acoustic sensing (DAS) and/or distributed vibration sensing (DVS) is in a control office (CO)/central office (100) for remote monitoring of entire cable route. The DFOS system is connected to the field optical fiber to provide sensing functions. The fiber can be a dark fiber or operational fiber from service providers. To create recognizable traffic patterns, a truck (201) is involved in the survey and driving parallel and close to the cable. The GPS device (202) is carried by the truck (201) and sends the GPS coordinates and time stamp to the pairing system (102) in the CO. By matching the time stamps of the GPS device and the DFOS system, the geographic location of the targeted place can be paired with fiber distance from waterfall data and GPS coordinates in the A.I. platform (103). One or more reference points (302) on the route are needed to help determine the trajectory of vehicle in use from the other traffic. The reference point is typically pickup as the end points of a straight section of the cable FIG. 10 shows illustrative waterfall traces with vehicle trajectories according to aspects of the present disclosure. As depicted, the traces are collected in a 3-minute window from the DFOS systems. The vehicle trajectories can be extracted not only from buried cable but also suspended, aerial cable as well. Hence, our illustrative architecture can be used for entire cable route mapping except for any cable section that is not vehicle-accessible and/or buried under water. In the The path match algorithm is described schematically as follows in the drawing/figures.

Figure 11:
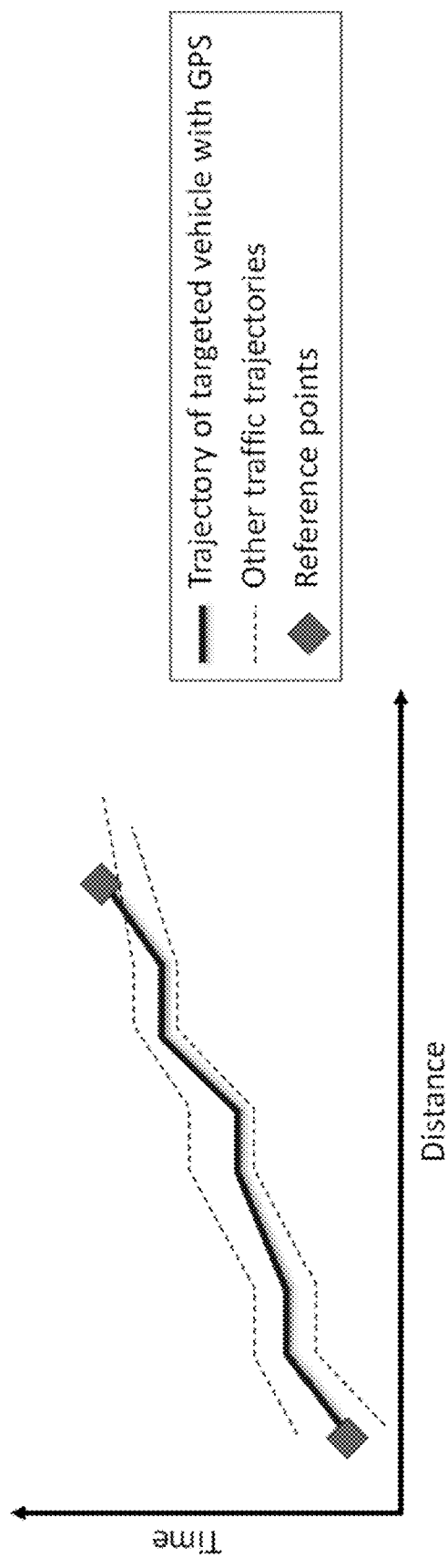
FIG. 11 is a schematic plot illustrating vehicle trajectories from waterfall traces according to aspects of the present disclosure.

FIG. 11 is a schematic plot illustrating vehicle trajectories from waterfall traces according to aspects of the present disclosure. The figure shows a schematic graph of vehicle trajectories from waterfall traces including targeted vehicle, other road traffic and two reference points. The two reference points are selected in the beginning and the end of a straight cable section. If the cable turns or crosses the road to another side, more reference points may be needed.

Figure 12:
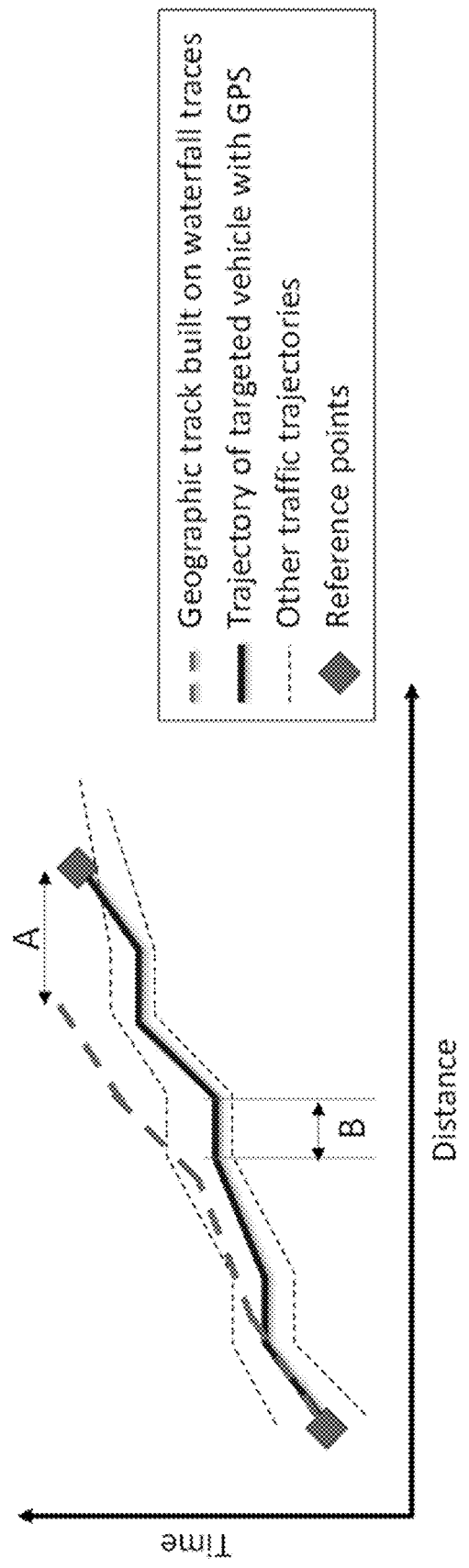
FIG. 12 is a schematic plot illustrating building a geographic track on waterfall traces according to aspects of the present disclosure.

FIG. 12 is a schematic plot illustrating building a geographic track on waterfall traces according to aspects of the present disclosure. In this scenario, the vehicle travels from the first reference point to the second reference point and the instant GPS is recorded. A virtual trajectory of the vehicle is created by the instant GPS list. By matching the time stamp from DFOS and GPS device and the location of the reference point, the geographic track can build on the waterfall traces and discover the corresponding vehicle trajectory of the targeted vehicle.

Note that there are some sections which can't match between geographic track and targeted vehicle trajectory. Section A represents the deference from the geo location and the cable length. Typically, the cable length is 20% longer than geo location which is resulted from the slack fibers (fiber coils) in the field. Additionally, the fiber coils inside the manhole can be discovered from Section B.

Figure 13:
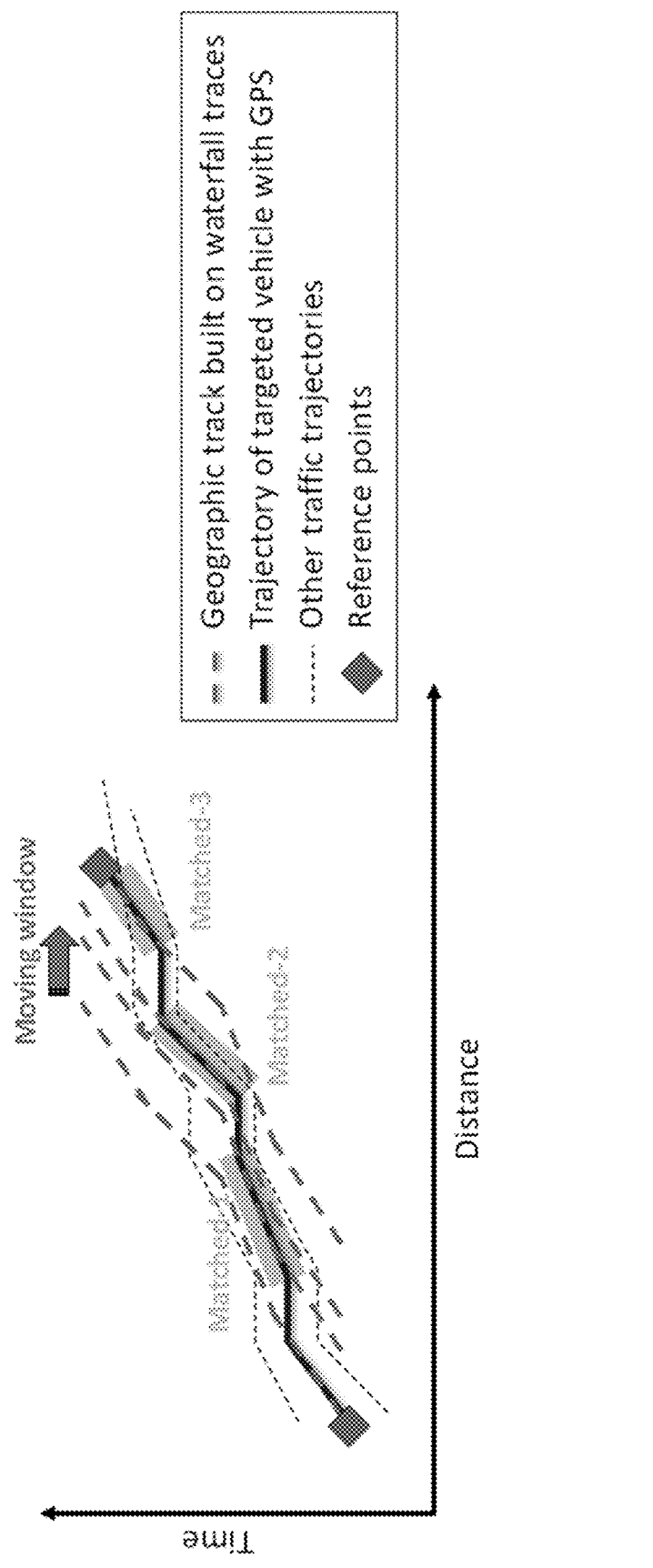
FIG. 13 is a schematic plot illustrating moving the geographic track on waterfall traces according to aspects of the present disclosure.

FIG. 13 is a schematic plot illustrating moving the geographic track on waterfall traces according to aspects of the present disclosure. By searching the horizontal offset, the geographic path can be matched on the waterfall trajectory. In addition, the signal intensity along the virtual trajectory is integrated and shift along the driving direction for an offset. A plot of integrated intensity vs the offset is built. The peak location corresponds to the virtual trajectory overlap section of the real waterfall trajectory. The distance between two peaks locations indicates the slack fibers coils.

Figure 14:
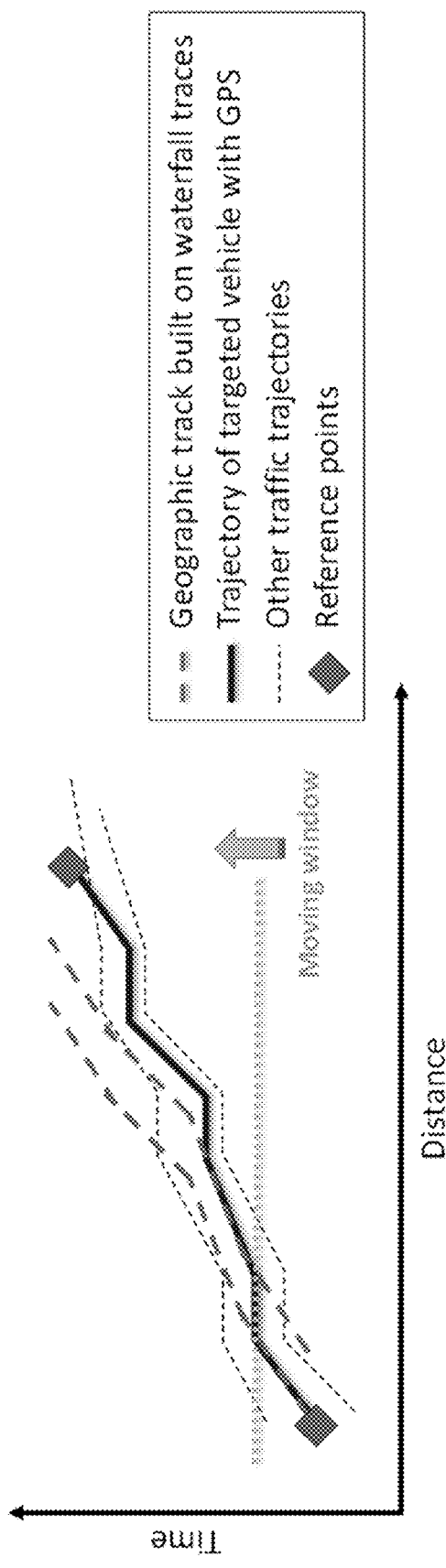
FIG. 14 is a schematic plot illustrating finding the horizontal sections on waterfall traces according to aspects of the present disclosure.

FIG. 14 is a schematic plot illustrating finding the horizontal sections on waterfall traces according to aspects of the present disclosure. In order to match the geo location and cable length, slack fiber lengths need to be found out from the waterfall traces. The fiber coils can be discovered based on the horizontal (flat, slope=0) sections. Hence, a vertical moving window can be employed to find the fiber coils and integrate the waterfall intensity along the track. At the location matched to the DFOS waterfall traces and geographic track, the total intensity can be shown as the peak value. It can be implemented by the following namely, create a list of the virtual trajectory which correspond to the offset at the peak integrated intensity and determine the horizontal path section by searching the maximum integrated intensity on two consecutive virtual trajectories.

Figure 15:
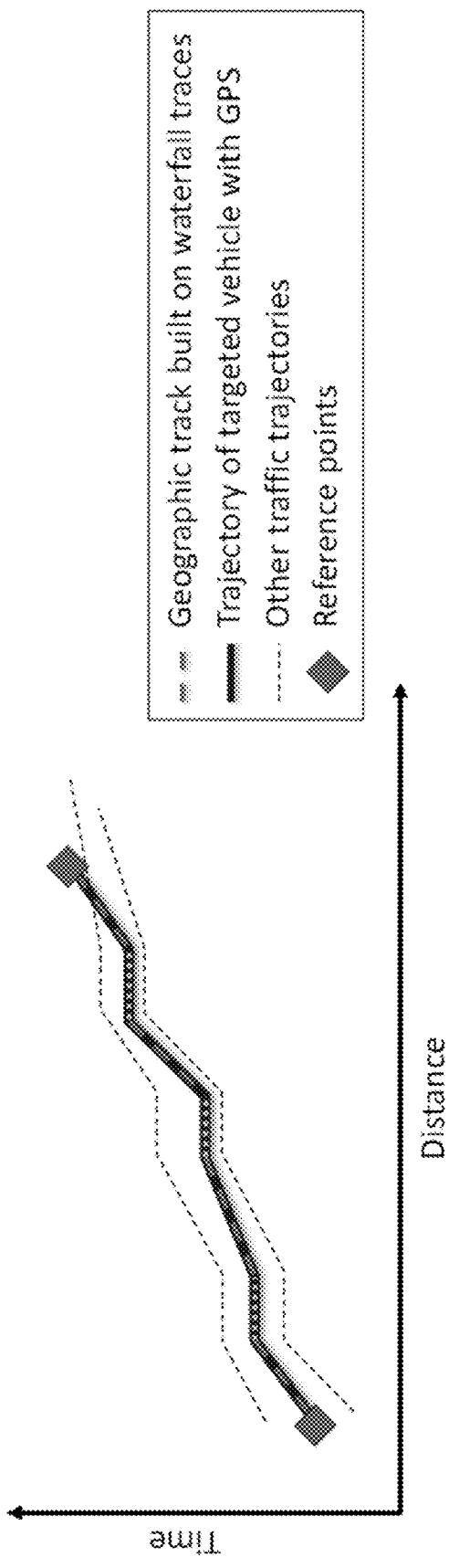
FIG. 15 is a schematic plot illustrating the fitted path according to aspects of the present disclosure.

FIG. 15 is a schematic plot illustrating the fitted path according to aspects of the present disclosure.

Figure 16:
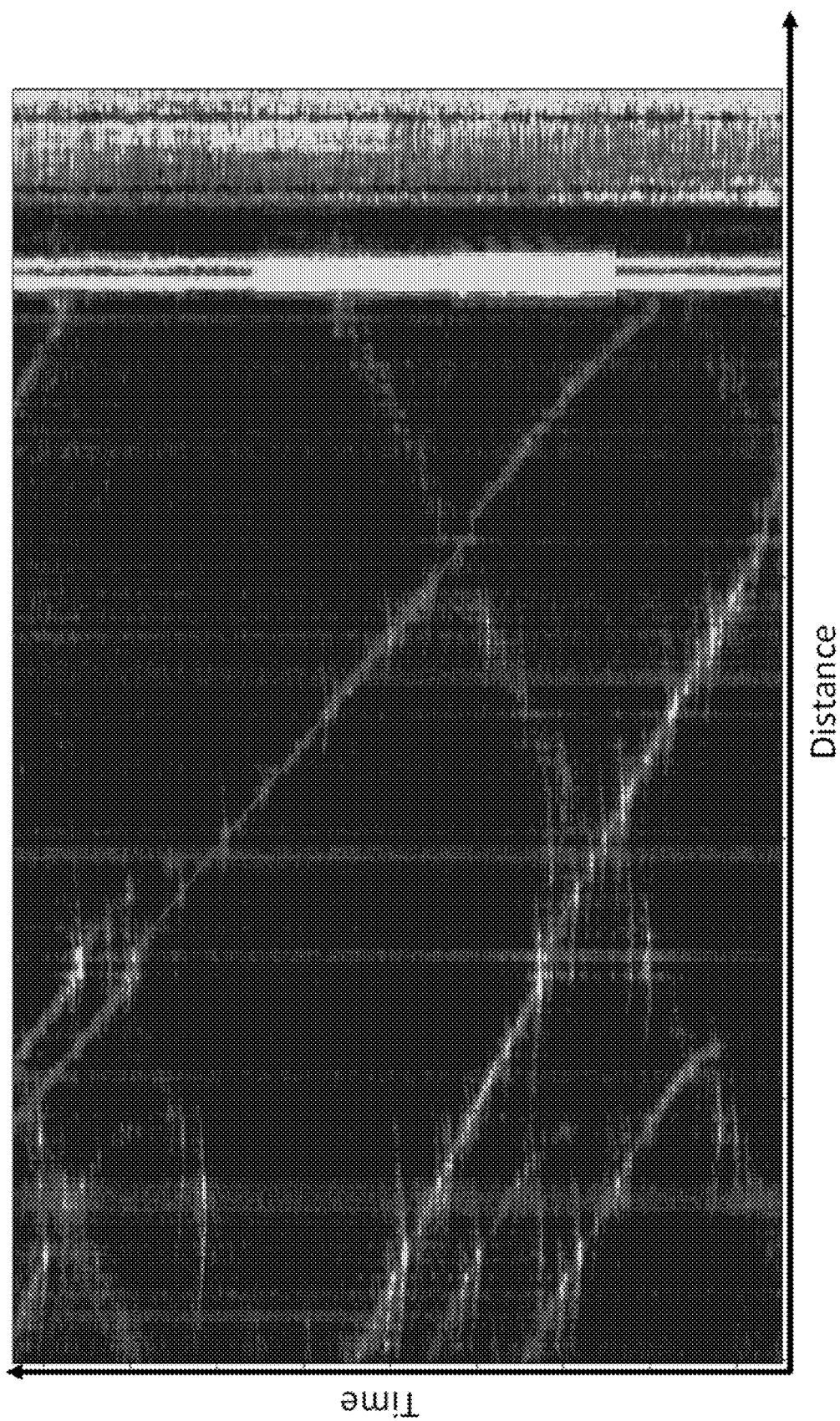
FIG. 16 is a schematic plot illustrating an optimal path on a waterfall trace according to aspects of the present disclosure.

FIG. 16 is a schematic plot illustrating an optimal path on a waterfall trace according to aspects of the present disclosure. The example of the optical path from GPS and detected vehicle trajectory from DFOS is shown and our inventive method may be matched to the field vehicle trajectory very well.

Figure 17:
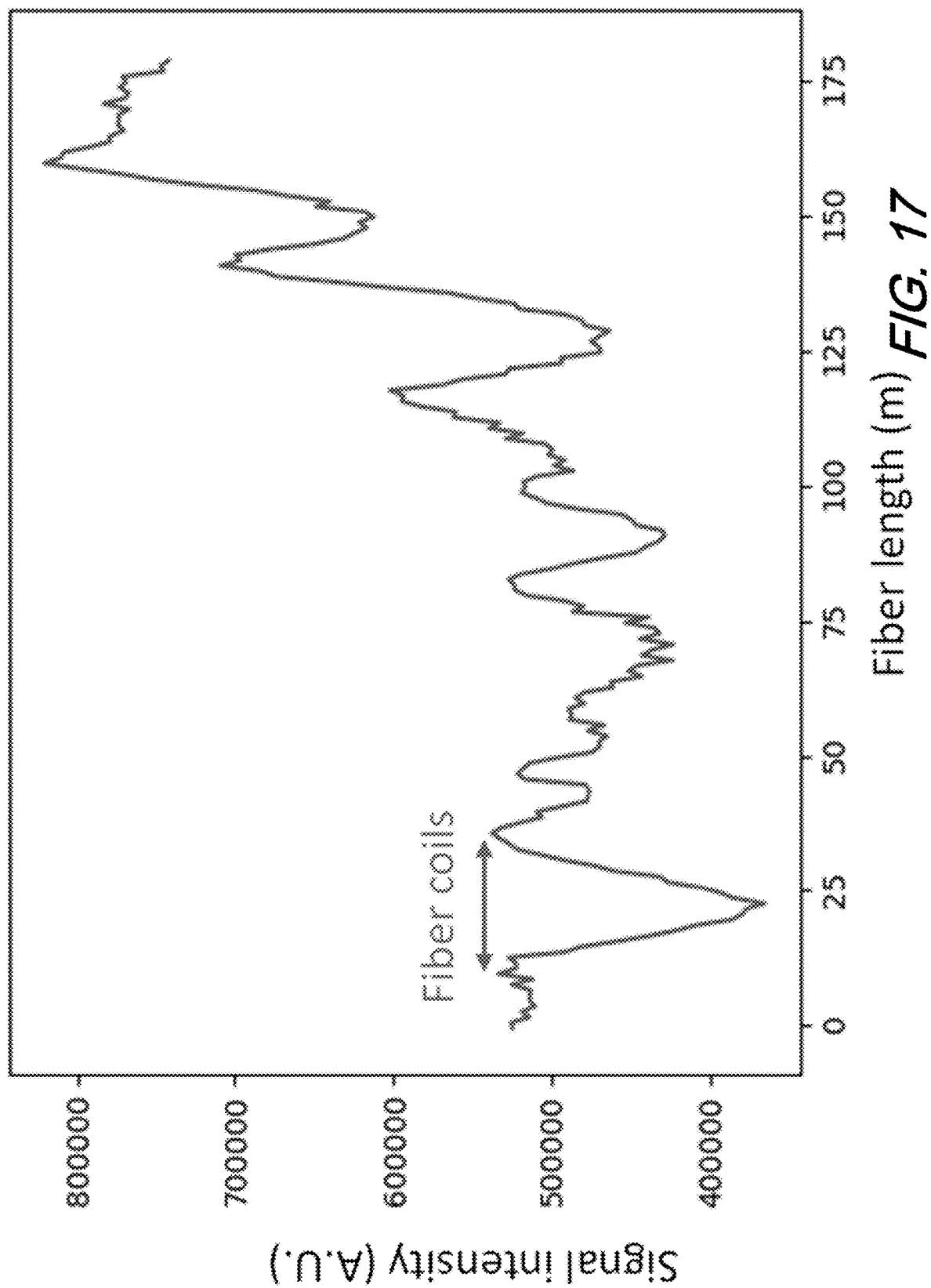
FIG. 17 is a plot illustrating dependence of integrated waterfall intensity on horizontal offset according to aspects of the present disclosure.

FIG. 17 is a plot illustrating dependence of integrated waterfall intensity on horizon. The peaks indicate the matching of geographic track with waterfall trajectory. The distances between two peaks are the length of fiber coils which can be on aerial cables and/or inside manholes and offset according to aspects of the present disclosure;

At this point we note that plots showing the result of searching the searching the optimal location for horizontal sections based on integrated signal intensity may be generated. The peaks indicate targeted locations.

Figure 18:
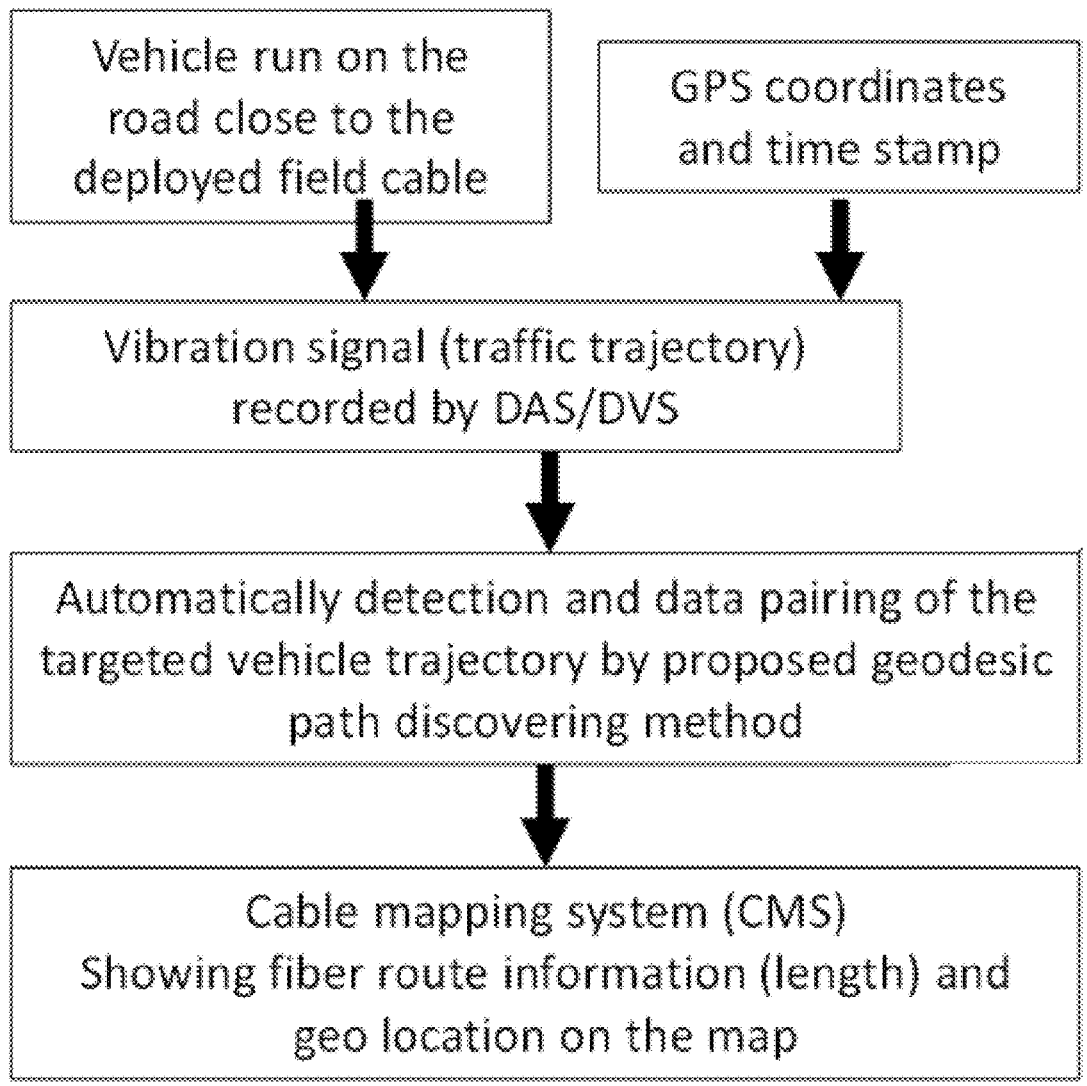
FIG. 18 is a schematic diagram illustrating automatic cable mapping by DFOS (DAS/DVS) according to aspects of the present disclosure.

FIG. 18 is a schematic diagram illustrating automatic cable mapping by DFOS (DAS/DVS) according to aspects of the present disclosure.

Figure 19:
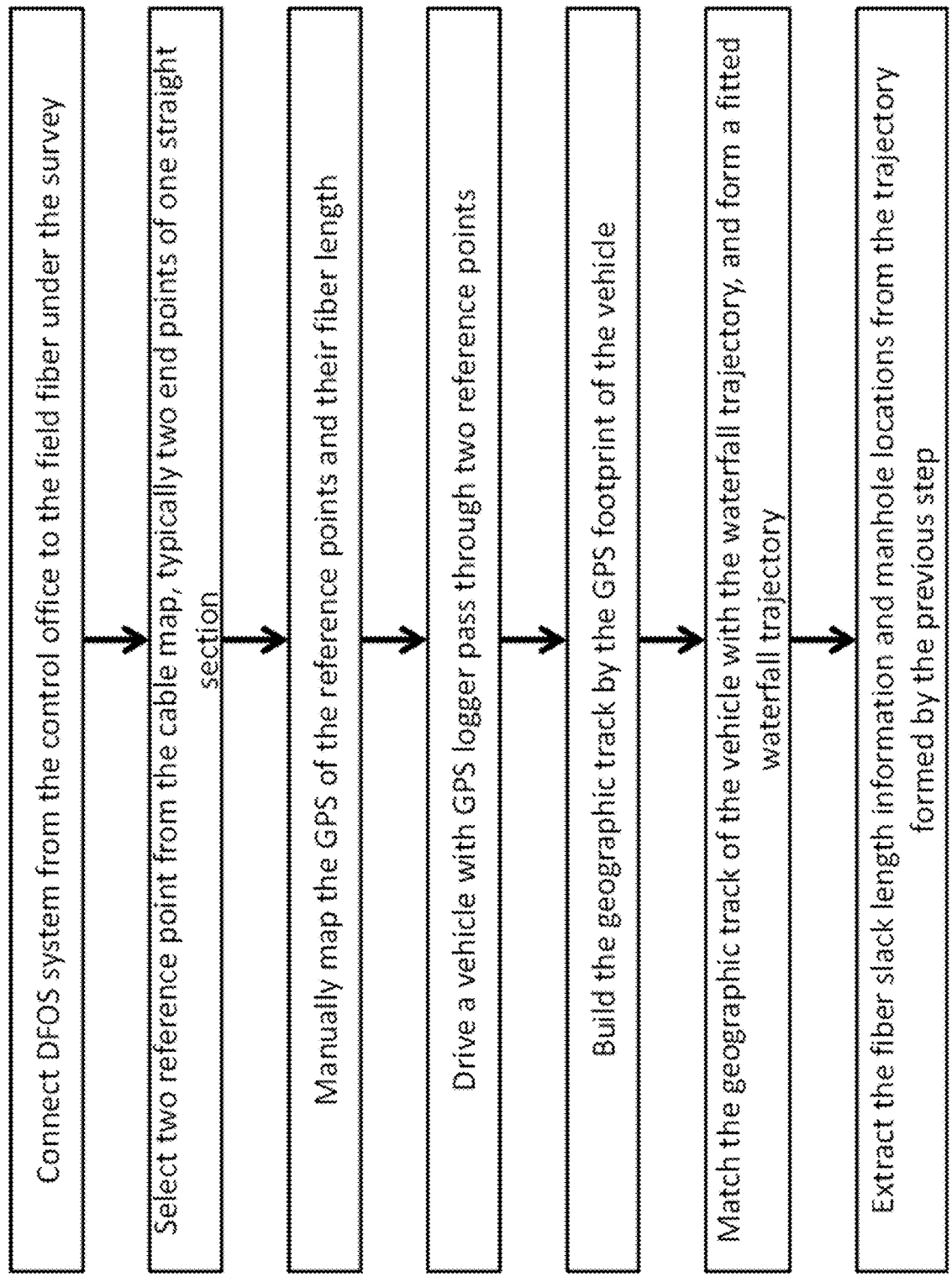
FIG. 19 is a flow diagram illustrating an overall process for automatic cable mapping by DFOS according to aspects of the present disclosure.

FIG. 19 is a flow diagram illustrating an overall process for automatic cable mapping by DFOS according to aspects of the present disclosure.

At this point, while we have presented this disclosure using some specific examples, those skilled in the art will recognize that our teachings are not so limited. Accordingly, this disclosure should be only limited by the scope of the claims attached hereto.

The invention claimed is:

1. A vehicle-assisted, buried cable localization method using distributed fiber optic sensing (DFOS), the method comprising:
   providing a length of optical fiber having a portion thereof buried underground;
   providing a DFOS system, said system including
      a DFOS interrogator and analyzer in optical communication with the length of optical fiber, said DFOS interrogator configured to generate optical pulses from laser light, introduce the pulses into the length of optical fiber and detect/receive Rayleigh reflected signals from the optical fiber, said analyzer configured to analyze the Rayleigh reflected signals and generate location/time waterfall plots from the analyzed Rayleigh reflected signals;
   operating a set of at least three vehicles in coordination with one another, said vehicles being operated sufficiently proximate to at least a portion of the length of optical fiber to provide mechanical excitations to the portion of the length of optical fiber, wherein each vehicle of the set of at least three vehicles includes a global positioning system (GPS) that generates GPS coordinates for the vehicle in which it is included;
   operating the DFOS system while the set of at least three vehicles are being operated, thereby providing mechanical excitations to the portion of the optical fiber thereby producing vibration events in the optical fiber and recording DFOS signals received during DFOS operation;
   continuously operating the DFOS system and the vehicles and determining time/location of vibration events from waterfall plots a associating the vibration events to a GPS location of the buried portion of the optical fiber.

2. The method of claim 1 wherein the time/location of vibration events from waterfall plots are determined without human intervention.

3. The method of claim 2 wherein the set of at least three vehicles are operated in substantially a straight line, one after another.

4. The method of claim 3 wherein the set of at least three vehicles are operated along a route having a manhole or other utility hole interposed between at least two of the vehicles.

5. The method of claim 4 wherein an amount of slack optical fiber located in the manhole or other utility hole is determined.

6. The method of claim 3 wherein traffic control device locations are determined from the waterfall data.

7. The method of claim 6 wherein the traffic control device is a traffic light and at least two of the set of at least three vehicles are stopped during operation in response to the traffic light while at least one of the set of at least three vehicles is/are not stopped during operation in response to the traffic light.

8. The method of claim 3 wherein the vehicles are operated upon a roadway that is located proximate to the buried optical cable, and a path of the buried optical cable diverges from the roadway and such divergence is determined.

9. The method of claim 8 further comprising generating a map showing the optical fiber locations by both GPS coordinates and length from the interrogator.

10. The method of claim 9 wherein other portions of the optical fiber that are not sufficiently proximate to the operation of the set of at least three vehicles are mapped to time/locations by an artificial intelligence analyzer using known time/locations.

* * * * *